(12) United States Patent
Ridgway et al.

(10) Patent No.: US 8,438,944 B2
(45) Date of Patent: May 14, 2013

(54) TELESCOPE POSITIVE LOCK FOR STEERING COLUMN

(75) Inventors: Jason Robert Ridgway, Bay City, MI (US); Melvin Lee Tinnin, Clio, MI (US); Kevin M. Burns, Flushing, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 62 days.

(21) Appl. No.: 12/952,991

(22) Filed: Nov. 23, 2010

(65) Prior Publication Data

US 2012/0125140 A1    May 24, 2012

(51) Int. Cl.
*B62D 1/184* (2006.01)
(52) U.S. Cl.
USPC .............. 74/493; 74/495; 280/775; 280/777
(58) Field of Classification Search .................. 74/492, 74/493, 494, 495; 280/777, 775
See application file for complete search history.

(56) References Cited

U.S. PATENT DOCUMENTS

| | | | | |
|---|---|---|---|---|
| 3,533,302 | A * | 10/1970 | Hansen | 74/493 |
| 4,793,204 | A * | 12/1988 | Kubasiak | 74/493 |
| 5,009,120 | A * | 4/1991 | Iseler et al. | 74/493 |
| 5,711,189 | A * | 1/1998 | Cartwright et al. | 74/493 |
| 5,813,289 | A * | 9/1998 | Renick et al. | 74/493 |
| 6,279,951 | B1 * | 8/2001 | Cartwright et al. | 280/775 |
| 8,047,096 | B2 * | 11/2011 | Ridgway et al. | 74/493 |
| 2007/0235998 | A1 * | 10/2007 | Demmon et al. | 280/775 |
| 2008/0191457 | A1 * | 8/2008 | Ridgway et al. | 280/775 |
| 2009/0250916 | A1 * | 10/2009 | Olgren et al. | 280/775 |
| 2009/0272219 | A1 * | 11/2009 | Okada et al. | 74/493 |
| 2010/0282016 | A1 * | 11/2010 | Oehri et al. | 74/493 |

* cited by examiner

*Primary Examiner* — Troy Chambers
*Assistant Examiner* — Valentin Craciun
(74) *Attorney, Agent, or Firm* — Cantor Colburn LLP

(57) ABSTRACT

A telescope lock mechanism for a steering column includes a plurality of strap teeth located at an upper jacket of the steering column, each strap tooth of the plurality of strap teeth having a strap tooth peak. A plurality of lock teeth are located at a lower jacket of the steering column. The plurality of locking teeth are rotatably secured at the lower jacket, such that when the plurality of locking teeth are rotated into an engaged position with the plurality of strap teeth, a plurality of lock teeth peaks are substantially non-parallel to the strap tooth peaks of the plurality of strap teeth.

16 Claims, 5 Drawing Sheets

TELESCOPE POSITIVE LOCK FOR STEERING COLUMN

FIELD OF THE INVENTION

The subject matter disclosed herein relates to steering columns for motor vehicles. More specifically, the subject disclosure relates to a lock mechanism for a telescope adjustment of a steering column.

BACKGROUND

Steering columns for motor vehicles are often provided with mechanisms for adjusting the steering column's position by an operator of the motor vehicle. Available adjustments typically include a tilt or rake adjustment in which an angular position of the steering column is changed relative to the operator, and a telescoping adjustment in which the steering column is extended toward the operator or compacted away from the operator. Telescope of the steering column is adjusted by releasing an adjustment lever from a secured position, which then allows for movement along an axis of the steering column of an upper jacket of the steering column relative to a lower jacket into which the upper jacket is located. Returning the adjustment lever to the secured position retains the upper jacket in a desired set position relative to the lower jacket.

In a vehicle impact situation, the steering column is configured to absorb energy of the impact to prevent or reduce injury to the operator due to impact with the steering wheel. In doing so, it is desired to further lock the telescope position of the steering column to allow controlled energy absorption in such situations. Typically, such a secondary lock mechanism is provided comprising teeth disposed at a rake bolt connected to the adjustment lever and move in a direction parallel to the rake bolt to engage corresponding teeth at the lower jacket during an impact situation to engage the secondary lock. Typically, such secondary lock mechanisms may be engaged in a peak-to-peak condition, which results in not being able to engage the locking lever, or causes noticeable, undesirable feel and/or noises during adjustment of the steering wheel position.

Accordingly, it is desirable to provide an improved telescope locking mechanism for a steering column.

SUMMARY OF THE INVENTION

In one exemplary embodiment of the present invention, a telescope lock mechanism for a steering column includes a plurality of strap teeth located at an upper jacket of the steering column, each strap tooth of the plurality of strap teeth having a strap tooth peak. A plurality of lock teeth are located at a lower jacket of the steering column. The plurality of locking teeth are rotatably secured at the lower jacket, such that when the plurality of locking teeth are rotated into an engaged position with the plurality of strap teeth, a plurality of lock teeth peaks are substantially non-parallel to the strap tooth peaks of the plurality of strap teeth.

In another exemplary embodiment of the present invention, a steering column assembly includes a lower jacket and an upper jacket slidably disposed in the lower jacket. The steering column assembly further includes a telescope lock mechanism having a plurality of strap teeth located at the upper jacket, each strap tooth of the plurality of strap teeth having a strap tooth peak. A plurality of lock teeth are located at the lower jacket. The plurality of locking teeth are rotatably secured at the lower jacket, such that when the plurality of locking teeth are rotated into an engaged position with the plurality of strap teeth, a plurality of lock teeth peaks are substantially non-parallel to the strap tooth peaks of the plurality of strap teeth.

In yet another exemplary embodiment of the present invention, a method of locking a telescope of a steering column assembly includes rotating a plurality of lock teeth located at a lower jacket of a steering column toward a plurality of strap teeth located at an upper jacket of the steering column slidably located in the lower jacket. The plurality of lock teeth are engaged with the plurality of strap teeth, thereby fixing a position of the upper jacket relative to the lower jacket, wherein a plurality of lock teeth peaks of the plurality of lock teeth are substantially non-parallel to a plurality of strap tooth peaks of the plurality of strap teeth.

The above features and advantages and other features and advantages of the present invention are readily apparent from the following detailed description of the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

Figure 1:
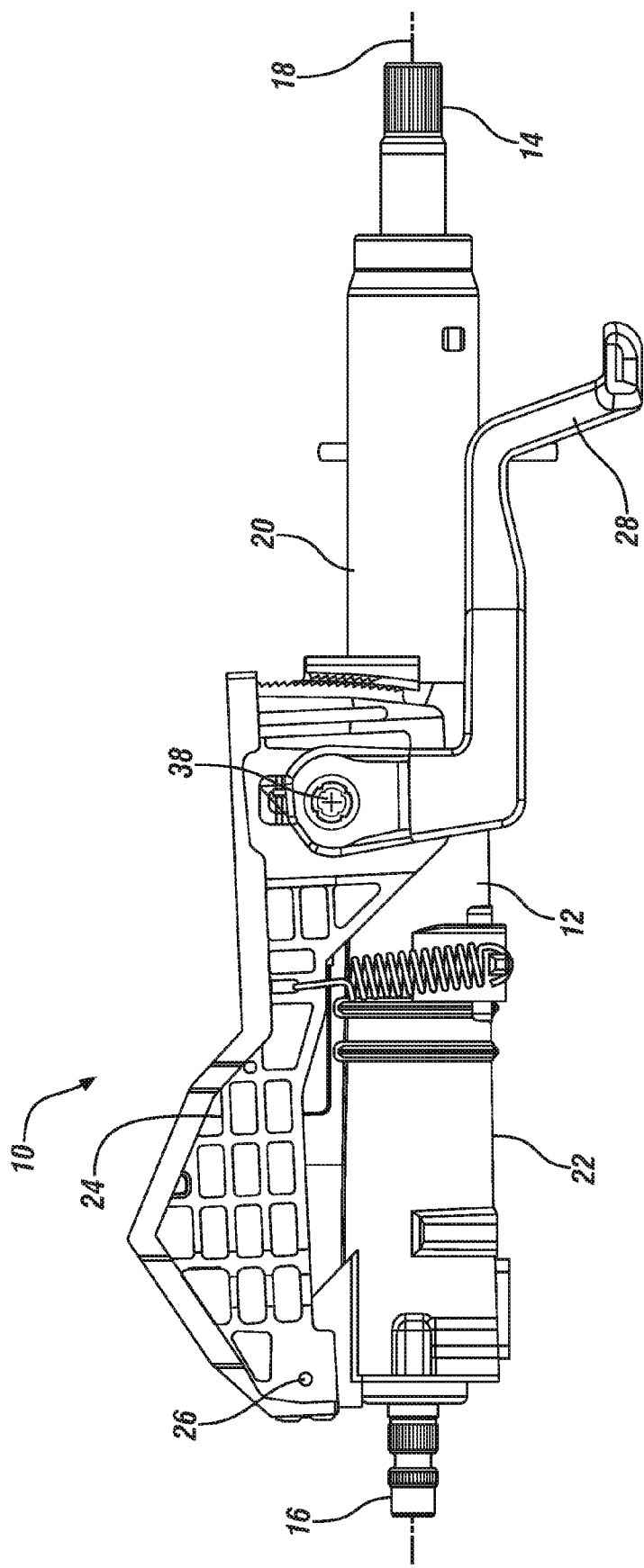
FIG. 1 is a schematic view of an embodiment of a steering column assembly.

In accordance with an exemplary embodiment of the present invention, shown in FIG. 1 is an embodiment of a steering column assembly 10 for a motor vehicle, including at least a telescope adjustment. The steering column assembly 10 includes a column 12 having a first end 14 to which a steering wheel (not shown), or other operator control, is connectable, and a second end 16 which is operably connected to a steering system (not shown) that translates rotational motion of the column 12 about a column axis 18 into steering motion of the motor vehicle. In some embodiments, the column 12 includes an upper jacket 20 extending from the first end 14. The upper jacket 20 is at least partially located in a lower jacket 22 which extends from the second end 16 toward the first end 14. Motion of the upper jacket 20 in the lower jacket 22 along the column axis 18 is a telescopic adjustment of the steering column assembly 10. It is to be appreciated that while in the embodiment of FIG. 1, the upper jacket 20 is at least partially located in the lower jacket 22, in some embodiments, the configuration is substantially reversed, with the lower jacket 22 at least partially located inside the upper jacket 20. The lower jacket 22 is secured to a rake bracket 24 at a pivot 26.

Figure 2:
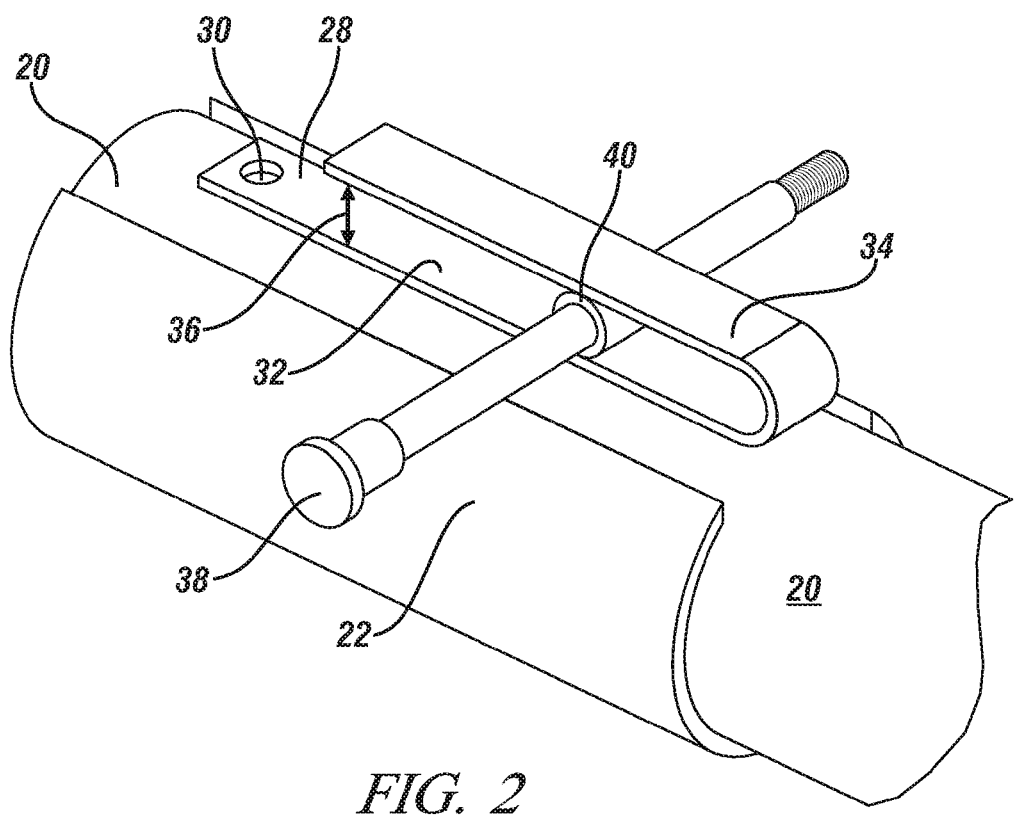
FIG. 2 is a schematic view of an telescoping adjustment mechanism for a steering column assembly.

A telescoping adjustment mechanism is provided as shown in FIG. 2. An energy absorbing (EA) strap 28 is secured to the upper jacket 20 via, for example, a strap retainer 30 which may be a screw or bolt or the like. The EA strap 28 includes a lower leg 32 which extends along the upper jacket 20 and a return leg 34 which, as shown extends substantially parallel to the lower leg 32 at a distance 36 therefrom. A locking bolt 38 extends through the lower jacket 22 and between the lower leg 32 and return leg 34 of the EA strap 28. The locking bolt 38 includes a locking member 40 located between the lower leg 32 and the return leg 34. The locking member 40 is configured to actuate the EA strap 28 when the locking bolt 38 is rotated to a lock position to maintain a desired relative position of the upper jacket 20 and lower jacket 22.

Figure 3:
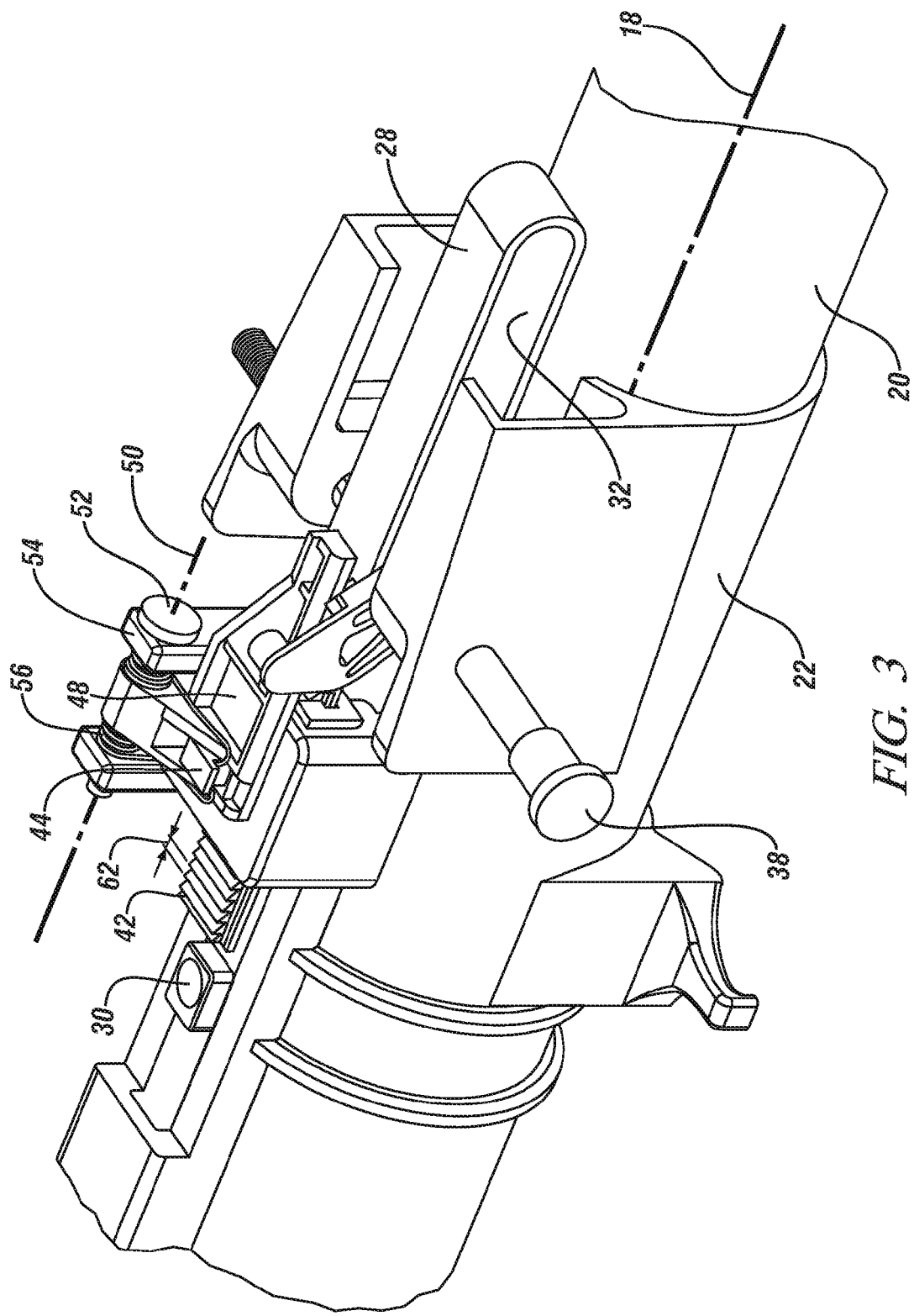
FIG. 3 is an embodiment of a primary lock mechanism for a steering column assembly.

A primary telescope lock mechanism is provided in the steering column assembly 10, which engages the lower jacket 22 to the upper jacket 20 and control energy absorption in a vehicle impact situation. An embodiment of the primary lock mechanism is shown in FIG. 3. A plurality of strap teeth 42 located at the lower leg 32 of the EA strap 28. A tooth lock 44 is located at the lower jacket 22 and includes a plurality of lock teeth 46 which are engageable with the plurality of strap teeth 42. In the embodiment of FIG. 3, the tooth lock 44 is secured to a carrier 48. The carrier 48 is rotatably secured to the lower jacket 22 with an axis of rotation 50 substantially parallel to the column axis 18. The carrier 48 is secured to the lower jacket 22 via a pin 52 extending through a carrier mount 54 and the carrier 48. A spring 56 is connected to the carrier mount 54 and the carrier 48, and serves at least two functions. First, the spring 56 acts in torsion about the axis of rotation 50 to provide a force to rotate the lock teeth 46 toward, and into engagement with, the strap teeth 42. Second, the spring 56 acts in tension and compression along the axis of rotation 50 to shift a position of the lock teeth 46 along the axis of rotation 50 to better align the lock teeth 46 with the strap teeth 42. In some embodiments, the spring 56 allows movement of the lock teeth 46 along the axis of rotation 50 of about 1 tooth width 62.

Figure 4:
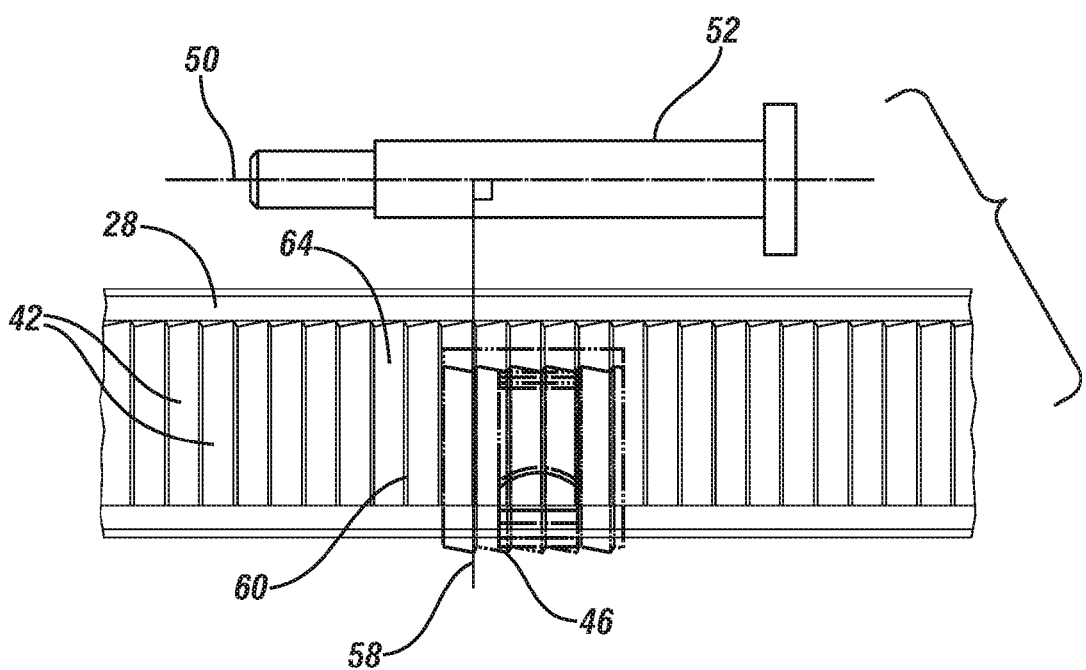
FIG. 4 is an illustration of relative tooth peak positions of and embodiment of a primary lock mechanism for a steering column assembly.

As shown in FIG. 4, the lock teeth 46 a lock tooth peak 58 is substantially perpendicular to the axis of rotation 50. The strap teeth 42, however, have strap teeth peaks 60 which are substantially non-perpendicular to the axis of rotation 50. For example, a difference in angular position of the lock tooth peak 58 and the strap tooth peak 60 may be about 1 degree, such that in some embodiments the lock tooth peak 58 extends at 90 degrees from the axis of rotation 50, while the strap tooth peak 60 extends at an angle of 91 degrees from the axis of rotation 50. The angular difference in the positions of the lock tooth peaks 58 and strap tooth peaks 60 encourages engagement of the lock tooth peak 58 with a strap tooth ramp 64, rather than a peak-to-peak contact between the strap teeth 42 and the lock teeth 46, thus prohibiting prolonged travel of the strap teeth 42 relative to the lock teeth 46 and travel along the peaks of the strap teeth 42.

Figure 5:
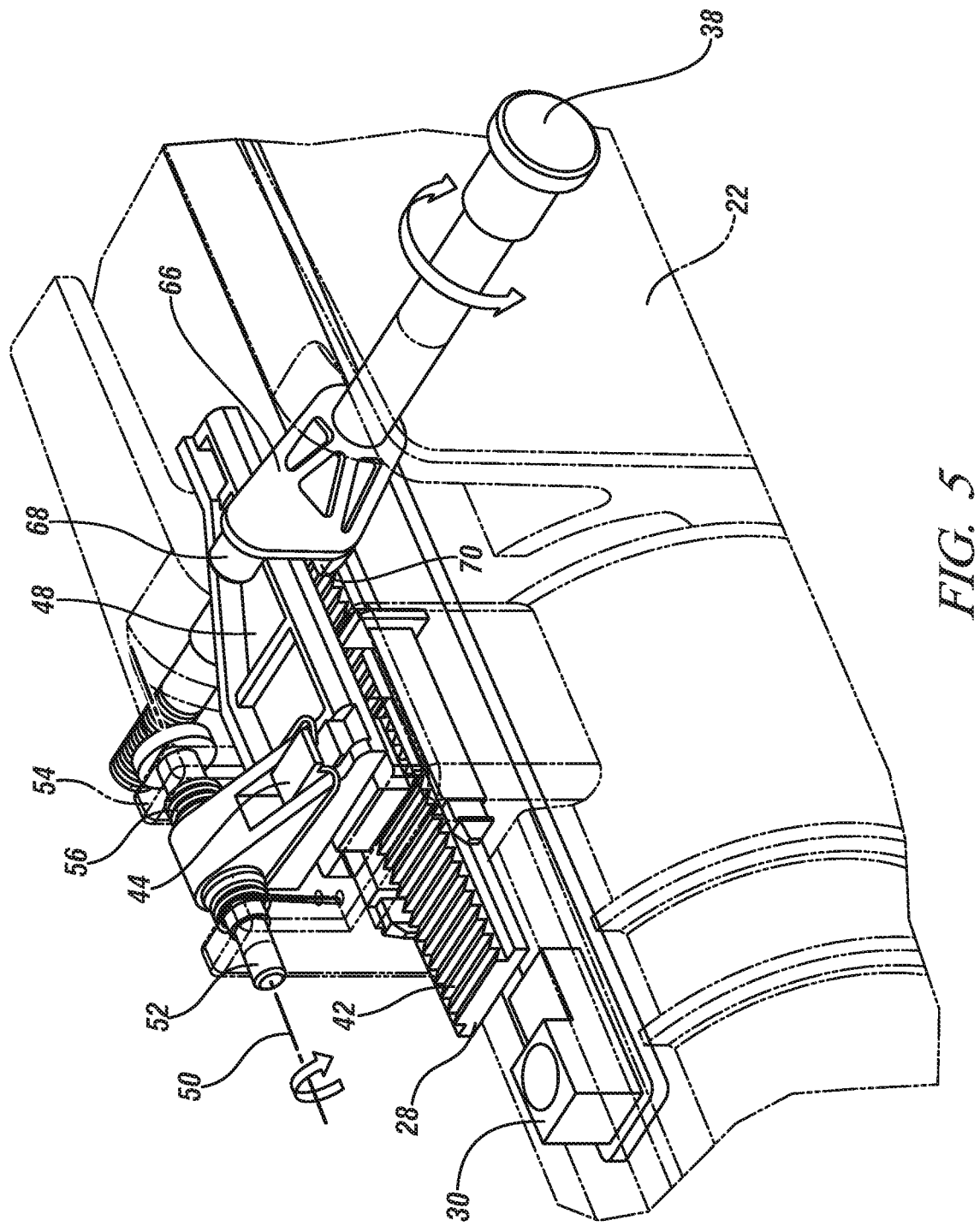
FIG. 5 is an illustration of an embodiment of a primary lock mechanism in a locked position.

Referring now to FIG. 5, the locking bolt 38 includes a bolt driver 66 affixed thereto. When the locking bolt 38 is rotated into a locked position as shown in FIG. 5, a feature on the bolt driver 66, for example, tab 68, contacts the carrier 48 and forces the carrier 48 to rotate about the axis of rotation 50 to engage the lock teeth 46 with the strap teeth 42 thereby engaging the primary lock mechanism.

Figure 6:
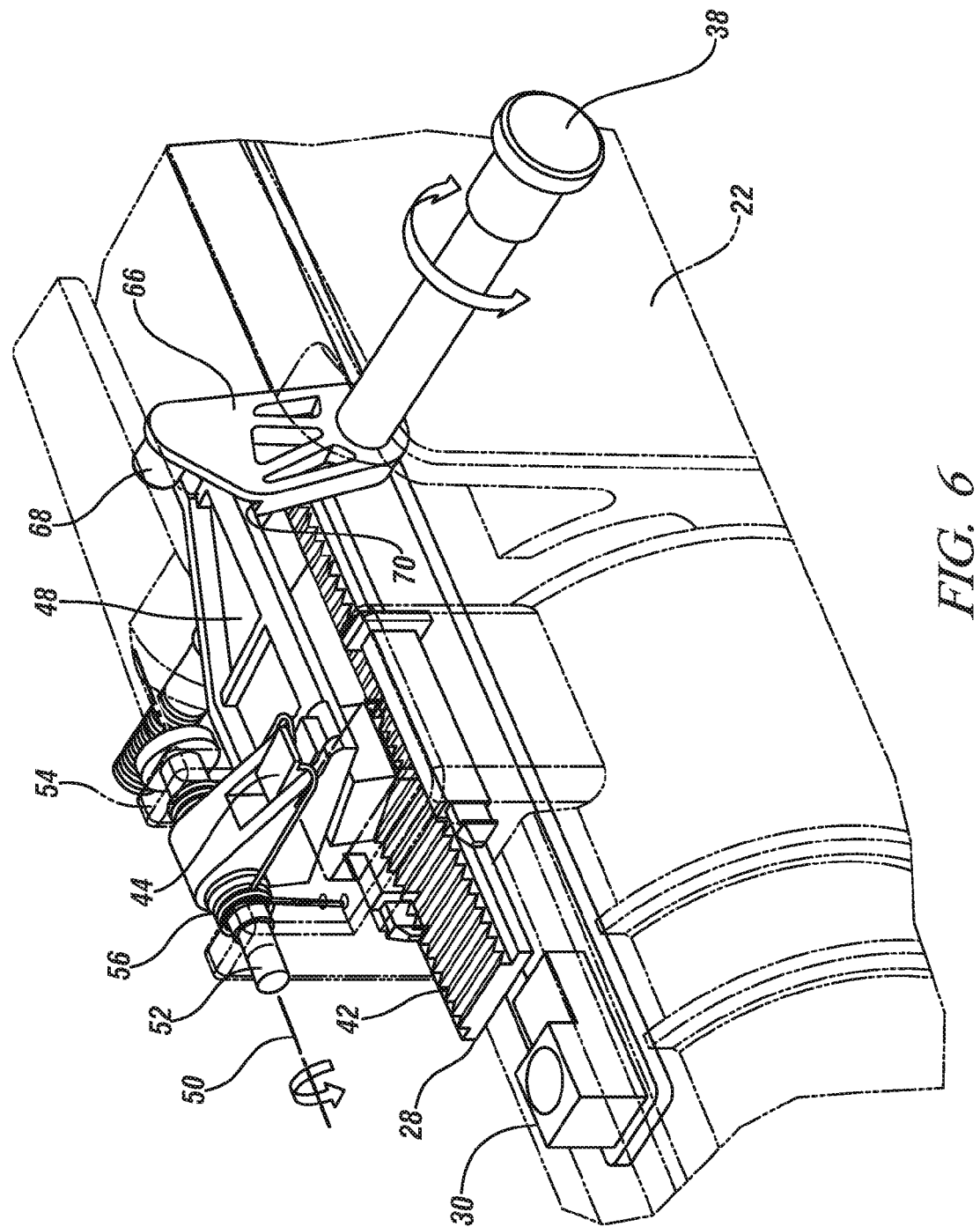
FIG. 6 is an illustration of an embodiment of a primary lock mechanism in an unlocked position.

Similarly, referring to FIG. 6, when the locking bolt 38 is rotated to an unlocked position, the tab 68 rotates away from the carrier 48, thus releasing the carrier 48 and allowing the lock teeth 46 to disengage from the strap teeth 42. To urge disengagement of the lock teeth 46 from the strap teeth 42, the bolt driver 66 includes a secondary tab 70 which, when the bolt driver 66 is rotated to the unlocked position, lifts the carrier 48 to disengage the teeth. This disengages the primary lock mechanism and allows for telescopic adjustment of the steering column 12.

Further, in some embodiments, when tab 68 contacts carrier 48 to engage the primary lock mechanism, lock teeth 46 resting on a peak 60, the direction of rotation and the force exerted by tab 68 on carrier 48 nudges carrier 48 and tooth lock 44 along the axis of rotation 50 to urge the lock teeth 46 off the peak 60. This urges the spring 56 to compress and allow the carrier 48 to continue rotating about axis 50 so lock teeth 46 engage strap teeth 42.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed:

1. A telescope lock mechanism for a steering column comprising:
   a plurality of strap teeth located at an upper jacket of the steering column, each strap tooth of the plurality of strap teeth having a strap tooth peak; and
   a plurality of lock teeth located at a lower jacket of the steering column, the plurality of lock teeth rotatably secured at the lower jacket, such that when the plurality of lock teeth are rotated about an axis of rotation into an engaged position with the plurality of strap teeth, a plurality of lock teeth peaks have a first angular position relative to the axis of rotation that differs from a second angular position of the strap tooth peaks of the plurality of strap teeth relative to the axis of rotation;
   wherein a difference between the first angular position and the second angular position is about one degree.

2. The lock mechanism of claim 1, wherein the lock tooth peaks are substantially perpendicular to a central axis of the steering column.

3. The lock mechanism of claim 1, wherein the plurality of strap teeth peaks are substantially nonperpendicular to the central axis of the steering column.

4. The lock mechanism of claim 1, further comprising a pin to rotatably secure the plurality of lock teeth to the lower jacket.

5. The lock mechanism of claim 4, further comprising a spring located at the pin to bias a position of the plurality of lock teeth toward the plurality of strap teeth.

6. The lock mechanism of claim 5, wherein the spring further allows movement of the plurality of strap teeth along a central axis of the pin.

7. The lock mechanism of claim 1, wherein the plurality of lock teeth are operably connected to a locking bolt of the steering column assembly.

8. The lock mechanism of claim 7, wherein the locking bolt is positioned such that rotation of the locking bolt into a locked position results in engagement of the plurality of lock teeth with the plurality of strap teeth.

9. A steering column assembly comprising:
   a lower jacket;
   an upper jacket slidably disposed in the lower jacket;
   a telescope lock mechanism including:

a plurality of strap teeth located at the upper jacket, each strap tooth of the plurality of strap teeth having a strap tooth peak; and a plurality of lock teeth located at the lower jacket, the plurality of lock teeth rotatably secured at the lower jacket, such that when the plurality of lock teeth are rotated about an axis of rotation into an engaged position with the plurality of strap teeth, a plurality of lock teeth peaks have a first angular position relative to the axis of rotation that differs from a second angular position of the strap tooth peaks of the plurality of strap teeth relative to the axis of rotation;

wherein a difference between the first angular position and the second angular position is about one degree.

10. The steering column assembly of claim 9, wherein the lock tooth peaks are substantially perpendicular to a central axis of the steering column assembly.

11. The steering column assembly of claim 9, wherein the plurality of strap teeth peaks are substantially nonperpendicular to the central axis of the steering column.

12. The steering column assembly of claim 9, further comprising a pin to rotatably secure the plurality of lock teeth to the lower jacket.

13. The steering column assembly of claim 12, further comprising a spring located at the pin to bias a position of the plurality of lock teeth toward the plurality of strap teeth.

14. The steering column assembly of claim 13, wherein the spring further allows movement of the plurality of strap teeth along a central axis of the pin.

15. The steering column assembly of claim 9, wherein the plurality of lock teeth are operably connected to a locking bolt of the steering column assembly.

16. The steering column assembly of claim 15, wherein the locking bolt is positioned such that rotating the locking bolt into a locked position results in engagement of the plurality of lock teeth with the plurality of strap teeth.

\* \* \* \* \*